United States Patent
Li et al.

(10) Patent No.: US 8,305,014 B1
(45) Date of Patent: Nov. 6, 2012

(54) LIGHTING CONTROL USING SCAN AND STEP CHANGE

(75) Inventors: Li Li, Peachtree City, GA (US); Christopher Lee Bohler, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 376 days.

(21) Appl. No.: 12/776,725

(22) Filed: May 10, 2010

(51) Int. Cl.
G05F 1/00 (2006.01)
H05B 37/02 (2006.01)
H05B 39/04 (2006.01)
H05B 41/36 (2006.01)

(52) U.S. Cl. ........ 315/308; 315/112; 315/118; 315/291; 315/307

(58) Field of Classification Search .......................... None
See application file for complete search history.

(56) References Cited

U.S. PATENT DOCUMENTS 8,193,737 B2 * 6/2012 Peker et al. .................... 315/307
2002/0097000 A1 * 7/2002 Muthu et al. ................ 315/169.3

\* cited by examiner

Primary Examiner — Anh Tran
(74) Attorney, Agent, or Firm — King & Spalding LLP (57) ABSTRACT

A lighting control system determines an optimal way to operate one or more lamps to achieve a desired light output and/or to control one or more parameters. The lighting control system includes a detection circuit and a control circuit. The control circuit performs a wide-scope scan and a narrow-scope scan to find the best way to operate the lamps. The wide-scope scan includes driving the lamp(s) using multiple output settings, evaluating the light output at each setting, and determining which setting produced the best results. The narrow-scope scan includes making small adjustments to the settings to better refine the light output. The detection circuit includes one or more sensors for providing measurements of the light output by the lamp(s) or of a controller parameter, such as power consumption, for each setting evaluated by the control circuit.

29 Claims, 7 Drawing Sheets

LIGHTING CONTROL USING SCAN AND STEP CHANGE

TECHNICAL FIELD

The invention relates generally to lighting and more particularly to a lighting control system that determines optimal settings for operating one or more light sources using scanning and step changes and controls the light source(s) using the optimal settings.

BACKGROUND

Lighting control circuits are commonly used with electronic dimming ballasts and driver circuits to control the output of one or more lamps. Conventional lighting control circuits typically employ either an open-loop or closed-loop control methodology. A defining characteristic of an open-loop control system is that the control system does not use feedback to determine whether its output has achieved the desired goal. Instead, the open-loop controller uses a model or algorithm to determine an output based on an input. An example of open-loop lighting control is activating a lamp based on a timer. Another example of open-loop lighting control is adjusting the intensity of a lamp located inside a house based on the level of ambient light outside the house. Because an open-loop control system does not monitor the resulting illumination, the open-loop control system cannot adjust its output to compensate for any discrepancies between the desired lighting and the actual lighting.

Contrary to open-loop control systems, closed-loop control systems typically utilize some form of feedback. A closed-loop lighting control system may employ a light sensor for measuring a characteristic (e.g., intensity) of light in an area. The closed-loop control system can then adjust the output of a lamp based on the measured characteristic. For example, a closed-loop lighting system for controlling the intensity of light in a room may sample the intensity at predetermined intervals. If the sampled intensity is less than the desired intensity, the closed-loop control system can increase the output of a lamp to compensate.

Closed-loop lighting control systems are useful in simple applications that require a single controllable variable. However, closed-loop control systems are not practical for more complex systems that desire to control multiple parameters. In such complex cases, closed-loop control systems often become unstable and oscillate their outputs in an attempt to control each of the variables. Furthermore, these multi-parameter closed-loop control systems can be difficult and complex to configure.

SUMMARY

The present invention provides a lighting control system capable of determining an optimal way to operate one or more lamps to produce a desired light output and/or to control one or more parameters.

One aspect of the present invention provides a lighting control circuit. The lighting control circuit can include at least one lamp and a lamp driver circuit electrically coupled to the at least one lamp. The driver circuit can control at least one characteristic of power supplied to the at least one lamp in response to receiving a control signal including at least one driver setting defining the adjustment. The lighting control circuit can also include at least one sensor that measures a characteristic of light output by one or more lamps. The lighting control circuit can also determine an optimal way to drive the lamp. The process for the lighting control circuit can include providing driver settings to the driver circuit via the control signal. The process can also include obtaining a measurement from each of the at least one sensor in response to the driver circuit adjusting the characteristic based on each of the driver settings. The process can further include evaluating the measurements. The lighting control circuit can determine which one of the driver settings results in a better light output condition based on the evaluation and one or more parameters that define a desired light output. In essence, the control circuit can provide the control signal comprising the one driver setting to the lamp driver circuit after the process has completed.

Another aspect of the present invention provides a method for identifying an output setting for operating lamps. A combination of driver settings can be provided to a driver circuit. The combination of driver settings can include a driver setting defining at least one characteristic of supply power for at least one of the lamps. The driver circuit can control supply power to each of the lamps based upon the driver setting for each lamp. One or more parameters associated with light output by the lamps can be monitored. Additional combinations of driver settings can be provided to the driver circuit and the parameter(s) can be monitored for each combination. The parameters for each combination can be evaluated to determine which one of the combinations of driver settings result in a better light output condition based on the parameters and a desired light output.

Another aspect of the present invention provides a lighting system. The lighting system can include luminaires. Each luminaire can include at least one lamp and a circuit for controlling power to the lamp based upon a driver setting. The lighting system can also include sensors for measuring a characteristic of light output by at least one of the luminaires and a controller logically coupled to each luminaire and to each sensor. The controller can be programmed to perform a process to determine a driver setting combination for the luminaires that results in a better light output condition based on the measured characteristics. This process can include outputting driver setting combinations to the luminaires one at a time. Each driver setting combination can include a driver setting for each luminaire defining at least one characteristic of supply power to the at least one lamp of that luminaire. The process also can include obtaining a measurement of the characteristic from each sensor for each driver setting combination and evaluating the measurements to determine which one driver setting combination results in the better light output combination. The controller can operate the luminaires using the one driver setting combination.

Another aspect of the present invention provides a computer program product for identifying an output setting for operating lamps. This computer program product can include a computer-readable storage medium having computer-readable program code embodied therein. The computer-readable program code can include computer-readable program code for: (a) providing a combination of driver settings to a driver circuit, the combination of driver settings including a driver setting defining at least one characteristic of supply power for at least one lamp; (b) monitoring at least one parameter associated with light output by the lamp in response to the driver circuit controlling supply power to the lamp based upon the driver setting; and (c) repeating (a) and (b) for additional combinations of driver settings. The computer-readable program code can also include computer-readable program code for evaluating the monitored parameters for each combination of driver settings to determine which one of the combinations of driver settings resulted in a better light output condition based on the monitored parameters and a desired light output.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF EXEMPLARY EMBODIMENTS

The exemplary embodiments provide a lighting control system capable of determining an optimal way to operate one or more lamps to produce a desired light output and/or to control one or more parameters. For example, an exemplary lighting circuit described herein determines an optimal way to drive an array of lamps (or a single lamp) to achieve a desired correlated color temperature ("CCT"), a desired color rendering index ("CRI"), a desired light distribution, and/or a desired light consistency. The exemplary lighting control circuit is also capable of determining an optimal way to drive an array of lamps (or a single lamp) to achieve a desired lumen output, lighting efficiency, power efficiency (i.e., greater lumens/watt) efficiency, power consumption, and/or temperature (e.g., lamp driver temperature or room temperature). The lighting control circuit determines an optimal output setting, such as a driver setting, or combination of settings for lamp(s) based on one of the aforementioned parameters or any combination of those parameters. If the optimal way to drive the lamp(s) is based on a combination of parameters, each parameter is typically given a weight representative of that parameter's relative importance for determining the optimal combination of settings.

The lighting control circuit includes a control circuit and a detection circuit. The detection circuit includes one or more light sensors each for measuring a characteristic of light output. For example, the detection circuit typically includes a sensor for measuring light intensity and/or a color sensor for measuring CCT and CRI. The detection circuit also can include a voltage sensor, current sensor, and/or a temperature sensor.

The control circuit of the lighting control circuit performs one or more processes to determine the optimal way to operate the one or more lamps. One such process includes a wide-scope scan. This wide-scope scan includes testing a full range or a partial range of possible output settings or combinations of output settings for powering one or more lamps. In certain exemplary embodiments, these output settings are predetermined and programmed in a processor of the control circuit.

Each combination of output settings in a wide-scope scan typically includes a predetermined driver setting (e.g., current level, pulse width, or shape of the current waveform) for each of the one or more lamps. In one exemplary embodiment, a combination of driver settings includes a supply current level for each of the one or more lamps. The control circuit steps through a list or table of possible combinations. At each step, the detection circuit obtains measurements for each controlled parameter (e.g., CCT, CRI, power consumption, etc.) and the control circuit assigns a score to each combination based on the measurements. If a weight is assigned to each controlled parameter, the control circuit applies that weight to the measurement as part of this evaluation process. After each of the combinations are tested and scored, the control circuit operates the one or more lamps using the combination having the best score.

The control circuit is also capable of performing a narrow-scope scan. The narrow-scope scan includes applying small changes to the way the one or more lamps are driven and determining if the change is desirable. In one exemplary manner, the control circuit tests one or several possible adjustments and chooses the optimal combination. In certain exemplary embodiments, the lighting control circuit performs the narrow-scope change during normal lamp operation after the wide-scope scan has been completed. In such an embodiment, the narrow-scope scan provides additional refinement to the optimal combination found by the wide-scope scan.

Figure 1:
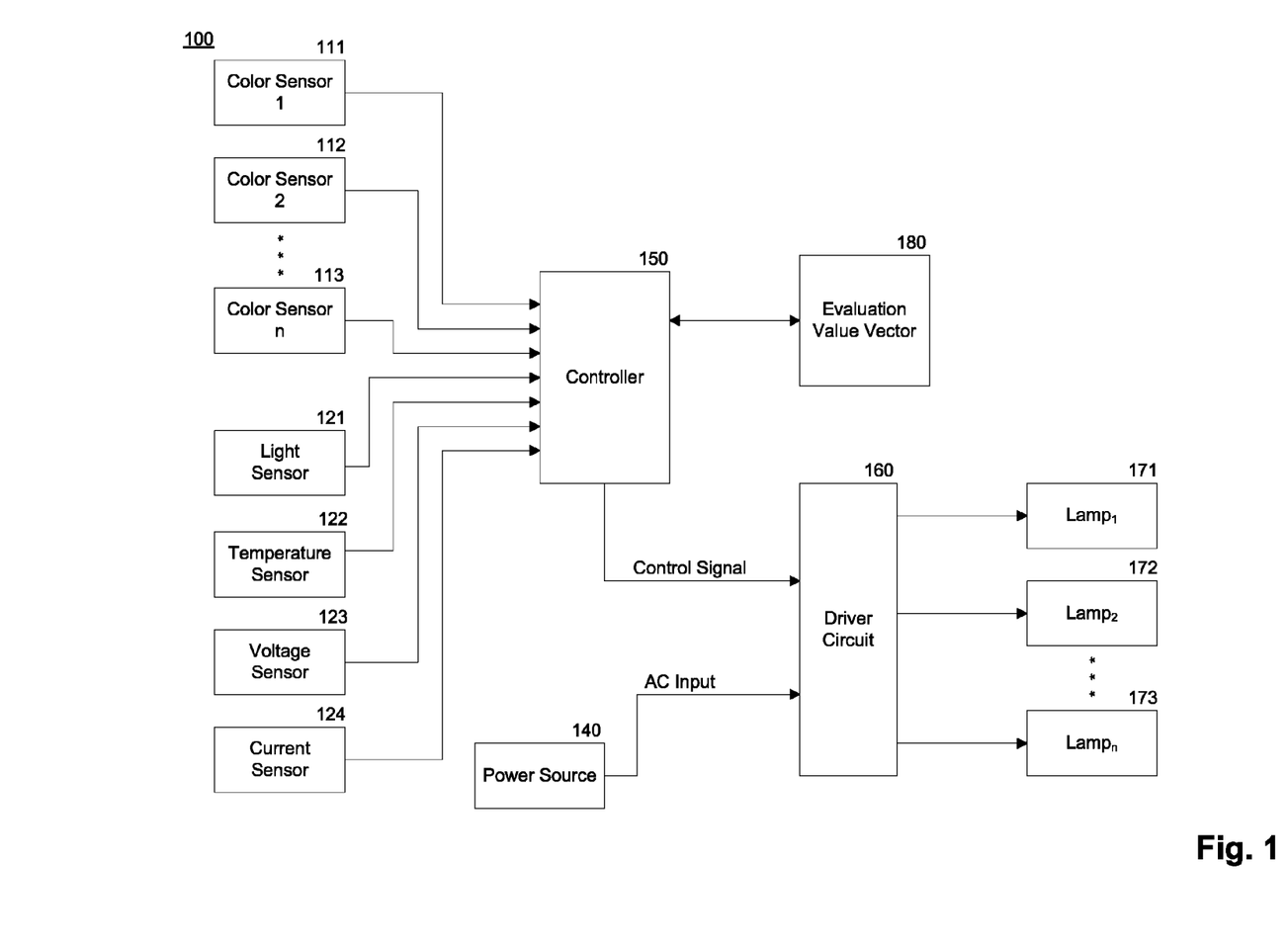
FIG. 1 is a block diagram depicting a lighting control circuit, in accordance with certain exemplary embodiments.

Turning now to the drawings, in which like reference numerals refer to like (but not necessarily identical) elements, exemplary embodiments are described in detail. FIG. 1 is a block diagram depicting a lighting control circuit 100, in accordance with certain exemplary embodiments. Referring now to FIG. 1, the exemplary lighting control circuit 100 includes a controller 150 that is programmed or configured to perform one or more processes to determine an optimal way to operate one or more lamps 171-173 to produce a desired light output and/or to control one or more parameters. The controller 150 can include a processor, microprocessor, microcontroller, computer, state machine, analog and/or digital circuitry, or other programmable or configurable technology.

The controller 150 is electrically coupled to a driver circuit 160 via one or more electrical conductors. Also coupled to the driver circuit 160 is a power source 140. In certain exemplary embodiments, the power source 140 provides an alternating current ("AC") input to the driver circuit 160 for powering the lamps 171-173. In one example, the power source 140 provides a standard United States voltage of 120 volts ("Vrms") at 60 hertz ("Hz"). Alternatively, the power source 140 provides other AC input voltages, including 240V at 60 Hz in North America, 230V at 50 Hz in Europe, or 400V at 50 Hz, also in Europe, or a direct current ("DC") input voltage.

The driver circuit 160 controls supply power from the power source 140 to the lamps 171-173 based on a control signal received from the controller 150. If the lamps 171-173 operate on AC power, the driver circuit 160 adjusts a voltage level, current level, and/or the shape of the AC current waveform received from the power source 140 based on the control signal and provides the adjusted AC signal to one or more of the lamps 171-173. In certain exemplary embodiments, the driver circuit 160 includes a power supply circuit (not shown) for converting an AC input waveform to a DC waveform. This power supply circuit allows an AC driver circuit 160 to operate DC powered lamps. For example, LEDs typically operate on DC power. In embodiments having DC operated lamps, the driver circuit 160 adjusts voltage level, current level, pulse width, and/or the shape of the DC current waveform output from the power supply based on the control signal and provides the adjusted DC signal to one or more of the lamps 171-173.

Any number of combinations of supply power control and adjustments can be made by the driver circuit 160 in response to a control signal received from the controller 150. In one example, the controller 150 issues a control signal to the driver circuit 160 to reduce the current level provided to the lamp 171. In another example, the controller 150 issues a control signal to the driver circuit 160 to provide a certain pulse width of a DC current waveform to each of the lamps 171-173.

As the driver circuit 160 is capable of adjusting either AC or DC waveforms in response to control signals received from the controller 150, the driver circuit 160 is capable of being used to drive substantially all types of lamps. For example, the driver circuit 160 is configured to drive LEDs, incandescent lamps, fluorescent lamps, compact fluorescent lamps ("CFLs"), and/or high energy discharge ("HID") lamps. Thus, the lamps 171-173 may include one or more different types of lamps.

The controller 150 is electrically coupled to a variety of sensors, including a number "n" of color sensors 111-113, a light sensor 121, a temperature sensor 122, a voltage sensor 123, and a current sensor 124. The type of sensors employed by the lighting control circuit 100 can vary depending on the application and the parameters controlled by the lighting control circuit 100. For example, if the power consumed by the lamps 171-173 is not a controlled parameter and carries no weight on the optimal way to drive lamps 171-173, the voltage sensor 123 and the current sensor 124 may be excluded. In addition, other types of sensors known to those of ordinary skill in the art having the benefit of this disclosure are also capable of being used in addition to or instead of those illustrated in FIG. 1. For example, an occupancy sensor (not shown) may be employed to adjust light output based on occupancy.

The color sensors 111 detect the color of light output by a lamp, a portion of a lamp, or an array or combination of lamps, such as lamps 171-173, and provide an indication of the detected color or CCT to the controller 150. In certain exemplary embodiments, a color sensor 111-113 is employed for each lamp 171-173 in a multi-lamp application. In one example, multiple lamps 171-173 are used to output the same color and the lighting control system 100 controls the lamps 171-173 to have a consistent CCT. In such an example, each lamp 171-173 may have a one or more dedicated color sensors 111-113 to provide an indication of that lamp's color output. The lighting control circuit 100 can determine the optimal way to drive each of the lamps 171-173 such that the lamps 171-173 have the same or substantially similar color outputs and thus optimal color consistency. In certain exemplary embodiments, each of the color sensors 111-113 includes RGB color sensors.

In certain exemplary embodiments, the light sensor 121 includes one or more photosensors, such as a photocell, photoresistor, photodiode, phototransistor, photoFET, or any other device that is used to sense or detect light levels. In certain multi-lamp embodiments, the light sensor 121 is located in a position to measure the total light output of the lamps 171-173. In addition or in the alternative, each lamp 171-173 has one or more dedicated light sensors 121 to measure the amount of light output by that lamp 171-173. In certain exemplary embodiments, the controller 150 obtains light level measurements from the light sensor(s) 121 and uses the measurements in its determination of the optimal way to drive the lamps 171-173.

In the exemplary embodiment of FIG. 1, one or more temperature sensors 122 are positioned to measure the temperature of one or more of the driver circuit 160, the room or area that the lamps 171-173 are located, or any other temperature. In certain exemplary embodiments, the temperature of the driver circuit 160 and/or the temperature of the room or area that the lamps 171-173 are located is used by the controller 150 to determine the optimal way to drive the lamps 171-173. For example, in situations where the driver circuit 160 is sensitive to higher temperatures, especially those above a certain threshold, the controller 150 is capable of monitoring the temperature of the driver circuit 160 and modifying the power input/output or the operation of the lamps 171-173. Driver settings resulting in temperatures above that threshold may be avoided while driver settings resulting in lower temperatures may produce a better score. In another example where it is desirable to maintain a certain temperature in a room that the lamps 171-173 are located, the controller 150 is capable of monitoring the room temperature and modifying the power output to the lamps 171-173 or the operation of the lamps 171-173. If the room temperature is higher than the desired temperature, the controller 150 is capable of reducing power output to the lamps 171-173.

The exemplary voltage sensor 123 and the exemplary current sensor 124 are used to determine the amount of power consumed by one or more of the lamps 171-173. In certain exemplary embodiments, each lamp 171-173 has a designated voltage sensor 123 and current sensor 124 for measuring the voltage and current, respectively, provided to that lamp 171-173. The controller 150 uses these voltage and current measurements to calculate the power consumed by that lamp 171-173. In certain exemplary embodiments, a voltage sensor 123 and a current sensor 124 are positioned in the lighting control circuit 100 to measure the voltage and current, respectively, provided to all of the lamps 171-173 driven by the driver circuit 160. In certain exemplary embodiments, the controller 150 uses these voltage and current measurements to calculate the total power consumed by the lamps 171-173. Having power measurement(s) allows the controller 150 to determine an optimal way to drive the lamps 171-173 based in part or in whole on power consumption. The power measurement(s) also allows the controller 150 to determine an optimal way to drive the lamps 171-173 based on power efficiency.

As briefly described above, the controller 150 is programmed or configured to perform one or more processes to determine an optimal way to operate one or more lamps 171-173 to produce a desired light output and/or to control one or more parameters. The optimal way to operate the lamp(s) can be based upon a desired correlated color temperature ("CCT"), color rendering index ("CDI"), a light distribution, a light consistency, a lumen output, power consumption, driver circuit 160 temperature, ambient temperature proximal the lamps 171-173, lighting efficiency, and/or power efficiency. The controller 150 is capable of performing process(es) to determine the optimal way to operate the lamp(s) 171-173 based on one of the above parameters or based on any combination of the parameters. In addition, the controller 150 is capable of performing process(es) to determine an optimal way to operate one lamp 171-173 or a combination of lamps 171-173.

In certain exemplary embodiments, the controller 150 performs a wide-scope scan and/or a narrow-scope scans to find the optimal way to operate the lamps 171-173 (or just one lamp). In one exemplary embodiment, a wide-scope scan includes applying multiple driver settings or multiple combinations of driver settings to the lamps 171-173 and measuring the controlled parameters for each driver setting or combination of driver settings. In certain exemplary embodiments, a driver setting for an AC operated lamp 171-173 includes a supply voltage level, a supply current level, and/or an adjustment to the shape of the AC current waveform of the supply current. In certain exemplary embodiments, a driver setting for a DC operated lamp 171-173 includes a supply voltage, a supply current, a pulse width, and/or an adjustment to the shape of the DC current waveform of the supply current. A combination of driver settings includes a driver setting for more than one lamp 171-173. For example, a combination of driver settings in certain instances includes a driver setting for each of the lamps 171-173. For ease of subsequent discussion, the lighting control circuit 100 will be described in terms of combinations of driver settings.

The controller 150 sends a combination of driver settings to the driver circuit 160 via the control signal and the driver circuit 160, in turn, applies the driver settings to the lamps 171-173. After the driver settings have been applied, the controller 150 obtains a measurement of the controlled parameters from the appropriate sensors 111-124. For example, if the controlled parameters include color consistency of the lamps 171-173 and power consumption, the controller 150 would obtain a measurement from each color sensor 111-113 and from the voltage sensor 123 and current sensor 124. After obtaining the measurements, the controller 150 sends the next combination of driver settings one by one until each have been applied and measured.

The controller 150 evaluates the measurements for each combination of driver settings. In certain exemplary embodiments, the controller 150 applies a score to each combination. For example, the controller 150 may apply a score between zero and one hundred to each combination, where one hundred is a best case and zero is a worst case. In certain exemplary embodiments, each controlled parameter is given a weight representative of how important that parameter is to the total score relative to the other controlled parameters. In one example, color consistency is given a higher weight than power consumption. In another example having a temperature sensitive driver circuit 160, the temperature of the driver circuit 160 is given a higher weight.

In certain exemplary embodiments, the controller 150 generates an evaluation value vector 180 while performing the wide or narrow-scope scans. The evaluation value vector 180 stores a score for each evaluated combination of driver settings. After all of the settings have been applied and measured, the controller 150 determines which of the combinations has the best score (i.e., optimal settings) and uses that combination to operate the lamps 171-173. In addition or in the alternative, the controller 150 stores a score for each combination in a table or database stored on or coupled to the controller 150.

A narrow-scope scan includes applying small changes to the way one or more of the lamps 171-173 are operated and determining if the change is desirable or improves upon a previous setting. In certain exemplary embodiments, the controller 150 performs the narrow-scope scan during normal operation of the lamps 171-173 after a wide-scope scan has been completed. Alternatively, the controller 150 performs the narrow-scope scan irrespective of whether a wide-scope scan has been completed. In one exemplary embodiment, the controller 150 adjusts driver settings for each of the lamps 171-173 one at a time and monitors the effects of that adjustment. In addition or alternatively, the controller 150 also adjusts the driver settings for multiple lamps 171-173 and monitors the combined effects of the adjustments. In certain exemplary embodiments, the controller 150 determines whether to make further adjustments to a driver setting or multiple driver settings based upon the results of a previous adjustment. For example, if the controller 150 determined that a previous adjustment (e.g., increase in supply current or supply voltage to a lamp 171-173) to a driver setting resulted in an improved score, the controller 150 may make further adjustments to that driver setting until the score worsens and then return to the previous highest score setting for the driver.

Exemplary processes performed by the lighting control circuit 100 to determine an optimal way to operate lamps 171-173 to produce a desired light output and/or to control one or more parameters will now be described in more detail with reference to the flow charts illustrated in FIGS. 2-5. The exemplary embodiments can include a computer program product that includes a computer-readable storage medium and one or more computer programs embodied therein that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more steps described may be performed by hardware, software, or a combination thereof, as may be embodied in one or more computing systems.

Figure 2:
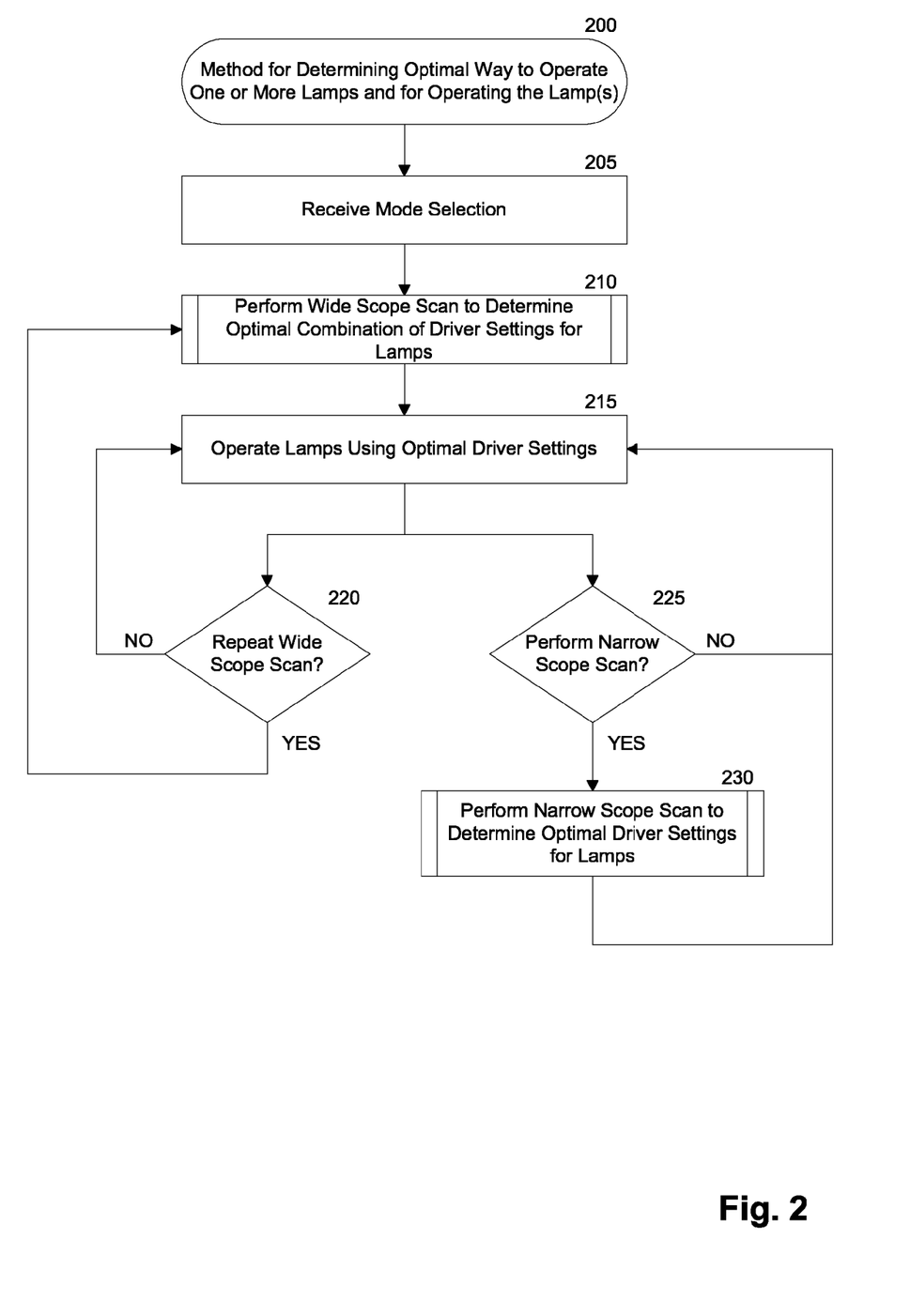
FIG. 2 is a flow chart illustrating a method for determining an optimal way to operate one or more lamps and for operating the lamp(s), in accordance with certain exemplary embodiments.

Turning now to FIG. 2, a flow diagram illustrating a method 200 for determining an optimal way to operate one or more lamps and for operating the lamp(s) is illustrated. Referring to FIGS. 1 and 2, the method 200 begins with the controller 150 receiving a mode selection. The selected mode includes an indication of the desired output from one or more lamps 171-173. In one example, a mode includes a desired lumen output for a single lamp or for multiple lamps 171-173. In another example, a mode includes a desired CRI or CCT for an array of lamps each having a single color or an array or multiple arrays of lamps having differing colors. In general, the mode identifies how the controller 150 should drive the lamps 171-173. In certain exemplary embodiments, the mode selection is received from a user using a selector switch at a control unit or at a light fixture housing the lamps 171-173. In certain exemplary embodiments, the mode selection is received from a remote device, such as a computer or a remote control device using radio frequency control, wireline control, wi-fi control or other known control methods.

In step 210, the controller 150 performs a wide-scope scan to determine an optimal combination of driver settings for operating lamps 171-173 for the selected mode. Step 210 is described in more detail with reference to FIG. 3. In step 215, the controller 150 operates the lamps 171-173 using the optimal combination of driver settings found by the controller 150 in step 210. The controller 150 sends the optimal combination of driver settings to the driver circuit 160 via a control signal. The driver circuit 160, in turn, controls supply power to each lamp 171-173 based on the driver setting for that lamp 171-173.

In step 220, the controller 150 conducts an inquiry to determine whether to perform another wide-scope scan. This determination may be made based upon operating hours of the lamps 171-173, number of on/off cycles that one or more of the lamps 171-173 have undergone, a predetermined time period, or any other parameter. If the controller 150 determines to perform another wide-scope scan, the "YES" branch is followed to step 210, where another wide-scope scan is performed. In one exemplary embodiment, the subsequent wide-scope scan includes each of the combinations evaluated in the initial wide-scope scan or alternatively, a partial set of the combinations. If the controller 150 determines not to perform another wide-scope scan, the "NO" branch is followed to step 215, where the lamps 171-173 are operated using a previously found optimal combination of driver settings.

In step 225, the controller 150 conducts an inquiry to determine whether to perform a narrow-scope scan. This determination may be based upon operating hours of the lamps 171-173, number of on/off cycles that one or more of the lamps 171-173 have undergone, or a time period. This determination may also be based upon a change in operating conditions, such as a change in ambient temperature, a change in supply voltage, and/or a change in the amount of power consumed by the lamps 171-173, or any other parameter. If the controller 150 determines to perform a narrow-scope scan, the "YES" branch is followed to step 230, where a narrow-scope scan is performed. Otherwise, the "NO" branch is followed to step 215, where the lamps 171-173 are operated using a previously found optimal combination of driver settings.

In step 230, the controller 150 performs a narrow-scope scan on the lamps 171-173 to determine an optimal combination of driver settings for operating lamps 171-173. Step 230 is described in more detail with reference to FIG. 4. After step 230 is completed, the method 200 returns to step 215.

Figure 3:
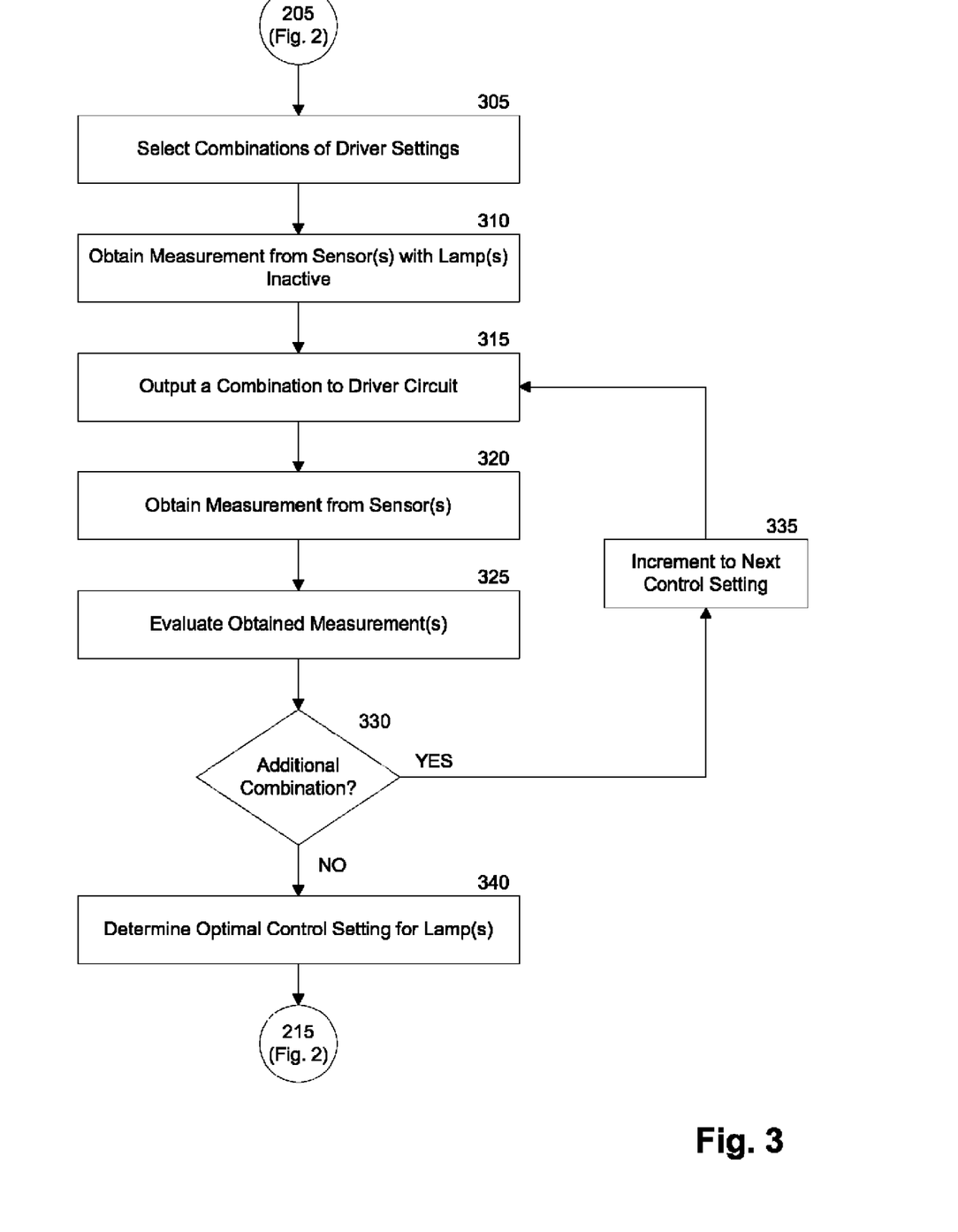
FIG. 3 is a flow chart illustrating a method for performing a wide-scope scan to determine an optimal way to operate one or more lamps, in accordance with certain exemplary embodiments.

FIG. 3 is a flow chart illustrating a method 210 for performing a wide-scope scan to determine an optimal way to operate one or more lamps, in accordance with certain exemplary embodiments, as reference in step 210 of FIG. 2. Referring to FIGS. 1 and 3, the method 210 begins by selecting a set of multiple combinations of driver settings to apply to the one or more lamps 171-173 in order to determine which of the combinations is optimal for the selected mode. In certain exemplary embodiments, the controller 150 stores or otherwise has access to a set of test combinations for each selectable mode. In certain exemplary embodiments, the controller 150 uses a single set of test combinations for each selectable mode.

In one exemplary embodiment, the set of combinations is generated and stored in memory in the controller 150 or in a remote memory storage area accessible by the controller 150. In certain exemplary embodiments, an operator, technician, or other user generates the test combinations for testing the lamps 171-173. The user then programs the controller 150 or otherwise inputs the generated combination into the controller 150. In certain exemplary embodiments, the test combinations are programmed into the controller 150 during a manufacturing process. In certain exemplary embodiments, the controller 150 generates the combinations based on a selection of parameters that are to be controlled. In certain exemplary embodiments, the controller 150 selects a subset of combinations from a set of combinations based upon a selection of parameters that are to be controlled or based upon a lighting mode selection.

As described above, the driver settings for an AC operated lamp 171-173 may include a supply voltage level, a supply current level, and/or an adjustment to the shape of the AC current waveform of the supply current. A driver setting for a DC operated lamp 171-173 may include a supply voltage, a supply current, a pulse width, and/or an adjustment to the shape of the DC current waveform of the supply current. In certain exemplary embodiments, each test combination includes a driver setting for each of the lamps 171-173. In one example, a first test combination includes a current level for each of the lamps 171-173 and a second test combination includes the same current level for lamps 171 and 172 and an adjusted current level for lamp 173. In another example, a first test combination includes the same or similar DC pulse widths for each lamp 171-173 and a second test combination includes an unmodified DC pulse width for lamps 172 and 173 and an adjusted DC pulse width for lamp 171. Although in the above examples only one characteristic (i.e., current level or DC pulse width) of a driver setting is varied from test combination to test combination, adjustments to multiple characteristics of a driver setting for a lamp 171-173 may be adjusted. For example, in a first test combination, the driver setting for a lamp 171-173 includes a first current level and a first DC pulse width, while a second combination includes a second current level and a second DC pulse width different than those of the first combination.

In step 310, the controller 150 obtains a measurement from each sensor 111-124 that measures a controlled parameter for the selected mode while the lamps 171-173 are inactive. For example, if CCT or CRI is one of the controlled parameters, the controller 150 obtains a measurement from one or more of the color sensors 111-113. In another example, if one of the controller parameters is power consumption, the controller 150 obtains a measurement from the voltage sensor 123 and the current sensor 124. In step 315, the controller 150 sends a control signal to the driver circuit 160 with one of the combinations of driver settings from the set of combinations. The driver circuit 160, in turn, controls the lamps 171-173 based on the driver settings.

In step 320, the controller 150 obtains a measurement from each sensor 111-124 that measures a controlled parameter for the selected mode. In step 325, the controller 150 evaluates the combination of driver settings based on the measurements. As described above with reference to FIG. 1, in certain exemplary embodiments, the controller 150 assigns a score to each combination. After the controller 150 evaluates the combination, the controller 150 stores the score in the evaluation value vector 180. Alternatively, the controller 150 stores the score in a table or in a database.

In step 330, an inquiry is conducted by the controller 150 to determine whether there are any additional combinations of driver settings to evaluate. If there is another combination to evaluate, the "YES" branch is followed to step 335, where the controller 150 increments the set of combinations to the next combination of driver settings. After step 335 is completed, the method returns to step 315. If all of the combinations have been evaluated, the "NO" branch is followed from step 330 to step 340. In step 340, the controller 150 determines which of the evaluated combinations is optimal for the selected mode. In certain exemplary embodiments where the controller 150 applies a score to each combination, the controller 150 selects the combination having the best score. Those of ordinary skill in the art will recognize that the best score may be the highest score, the lowest score, or a target score. After step 340 is completed, the method 210 proceeds to step 215, as referenced in FIG. 2.

Figure 4:
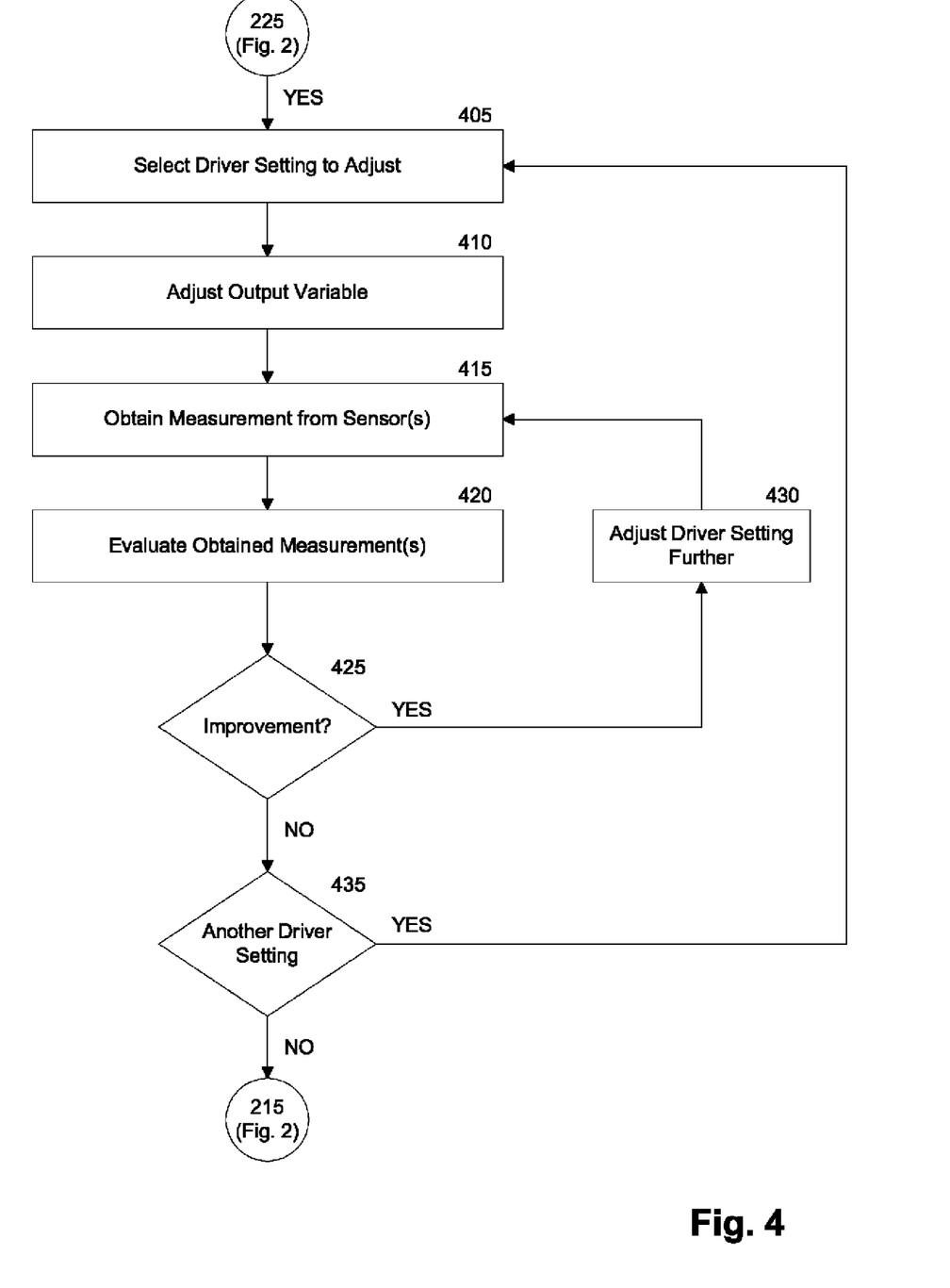
FIG. 4 is a flow chart illustrating a method for performing a narrow-scope scan to determine an optimal way to operate one or more lamps, in accordance with certain exemplary embodiments.

FIG. 4 is a flow chart illustrating a method 230 for performing a narrow-scope scan to determine an optimal way to operate one or more lamps 171-173, in accordance with certain exemplary embodiments, as referenced in step 230 of FIG. 2. Referring to FIGS. 1 and 4, the method 230 begins with the controller 150 selecting one or more driver settings to adjust. In alternative exemplary embodiments, the controller 150 selects a driver setting for one of the lamps 171-173 or for multiple lamps 171-173. The controller 150 is also capable of selecting a single characteristic of a driver setting to adjust or multiple characteristics.

In step 410, the controller 150 makes an adjustment to the selected driver setting(s) and sends the adjusted setting(s) to the driver circuit 160. The driver circuit 160, in turn, adjusts the output to the lamp(s) 171-173 based on the adjusted setting(s). If the selected driver setting is for a single lamp 171-173, then the output to that lamp 171-173 is adjusted only. If the selected driver setting is for multiple lamps 171-173, then the output to each of the multiple lamps 171-173 is adjusted.

The adjustment made in step 410 is typically a small adjustment compared to the adjustments made in the wide-scope scan. For example, an adjustment to a current level may be on the order of 1% or 2% of the previous current level provided to a lamp 171-173. In step 415, the controller 150 obtains measurements from each sensor 111-124 that measures a controlled parameter. In step 420, the controller 150 evaluates the updated measurements. In step 425, an inquiry is conducted at the controller 150 to determine if the adjustment to the driver setting(s) resulted in an improvement over the previous setting. If so, the "YES" branch is followed from step 425 to step 430. Otherwise, the "NO" branch is followed from step 425 to step 435.

In step 430, the controller 150 further adjusts the previously adjusted driver setting(s). This further adjustment is typically small, similar to that of the adjustment made in step 410, or may even be smaller. Also, this further adjustment may be in the same direction (e.g., increase in current level or decrease in current level) or in the opposite direction. For example, if a previously adjusted driver setting resulted in an improvement, the controller 150 may continue to adjust that driver setting in the same direction until a subsequent adjustment fails to result in an improvement. At that point, the controller 150 may revert back to the last driver setting that resulted in an improvement. After step 430 is completed, the method 230 returns to step 415 to obtain an updated measurement.

In step 435, the controller 150 determines whether to adjust another driver setting. If the controller 150 determines to adjust another driver setting, the "YES" branch is followed to step 405 where another driver setting is adjusted. Otherwise, the "NO" branch is followed to step 215, as referenced in FIG. 2. Although in this exemplary embodiment, the controller 150 is shown to proceed to another driver setting if an improvement is not found in step 425, the controller 150 may elect to instead adjust the current driver setting in a different direction. In one example, if a first adjustment increased the supply current level to lamp 171 and resulted in a less optimal score than the original or previous current level, then the controller 150 reduces the current level to lamp 171 and evaluates the result of that adjustment.

There are many different ways that the narrow-scope scan can be implemented. In one example, the controller 150 makes iterative adjustments to the driver setting for one of the lamps 171-173 while holding the driver setting for each other lamp 171-173 constant. After the controller 150 is finished making adjustments to the driver settings for the one lamp 171-173, the controller moves to another lamp 171-173 and makes iterative adjustments to the driver settings of the lamp 171-173. The controller 150 can repeat this process until the driver setting for each lamp 171-173 has been evaluated.

In another example, the controller 150 makes an adjustment to the driver setting of one of the lamps 171-173 and evaluates that adjustment. The controller 150 then determines if the adjusted driver setting for the one lamp 171-173 results in an improvement. If so, the controller 150 maintains the adjusted driver setting for the one lamp 171-173. If not, the controller 150 reverts back to the previous driver setting for the one lamp 171-173. The controller 150 then repeats this process for each other lamp 171-173 while holding the driver setting for each other lamp 171-173 constant. After the controller 150 makes an adjustment to the driver setting of each lamp 171-173, the controller 150 repeats the process recursively until an optimal setting is found.

Figure 5A:
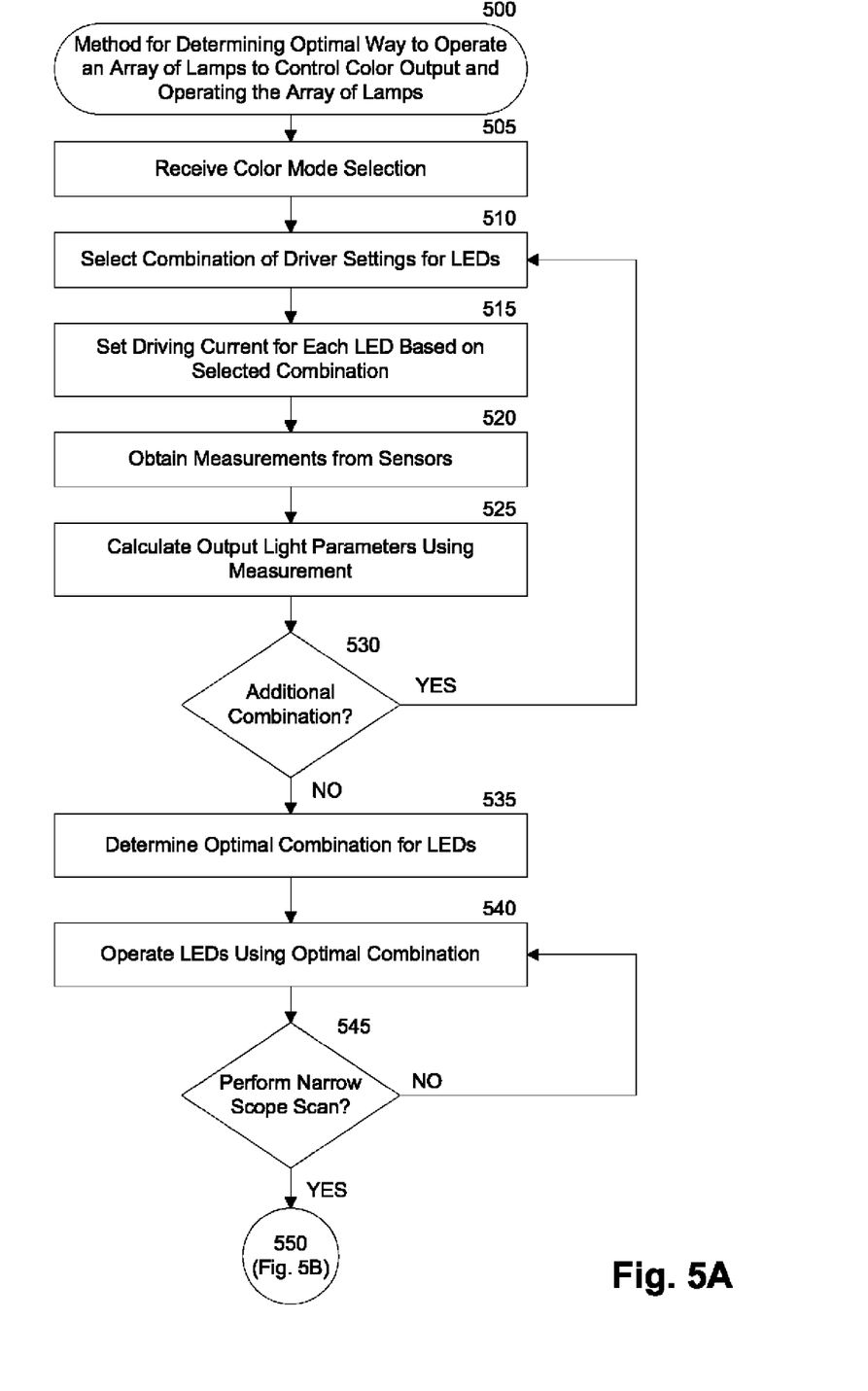
FIGS. 5A and 5B depict a flow chart illustrating a method for determining an optimal way to operate an array of lamps to control color output and operating the array of lamps, in accordance with certain exemplary embodiments.
Figure 5B:
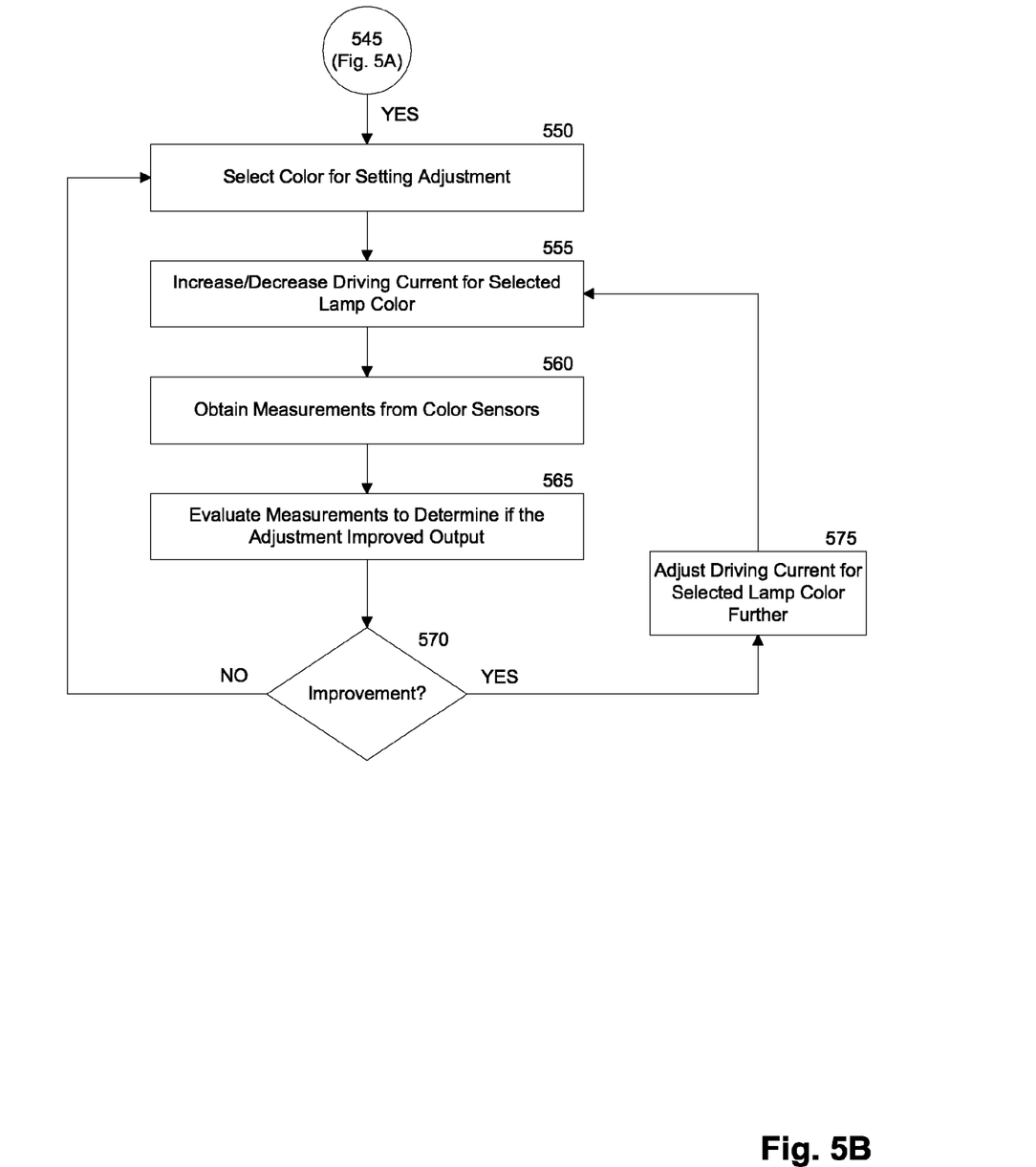

To illustrate the operation of exemplary embodiments of the invention, an example is provided below in FIGS. 5A and 5B. FIGS. 5A and 5B, collectively FIG. 5, depict a flow chart illustrating a method 500 for determining an optimal way to operate an array of lamps 171-173 to control color output and operating the array of lamps 171-173, in accordance with certain exemplary embodiments. The example disclosed herein is not intended to limit the scope of the foregoing disclosure, and instead is provided solely to illustrate a particular embodiment of the invention as it relates to operating an array of lamps to control color output. In this example, the lamps 171-173 include an array of white LEDs and an array of red LEDs. In addition, the controller 150 is programmed with the following color modes: white, red, warm red, cool white, and maximum lumen output. The controller 150 is further programmed to include a set of driver combinations for each mode to use in wide-scope scans.

Referring to FIGS. 1 and 5, in step 505 the controller 150 receives a selection of a color mode for an array of lamps 171-173. In step 510, the controller 150 selects the set of driver combinations corresponding to the selected mode. In step 515, the controller 150 sends a control signal to the driver circuit 160. The control signal includes the first combination of driver settings for the lamps 171-173 in the set of combinations. In one exemplary embodiment, the first combination includes a current level to provide each lamp 171-173. For example, the first combination might include a 50% output current level for the white LEDs and a 50% output level for the red LEDs. After receiving the control signal, the driver circuit 160, applies the settings to the lamps 171-173.

In step 520, the controller 150 obtains a measurement from a color sensor 111 that measures the total color output produced by the arrays of LEDs in one of the lamps 171-173. The controller 150 also obtains a measurement of the total level of light produced by the arrays of LEDs from the light sensor 121. In step 525, the controller 150 calculates the light parameters using the measurements obtained in step 520. The controller 150 calculates the CCT, CRI, and the total lumens output by the arrays of LEDs.

In step 530, an inquiry is conducted by the controller 150 to determine whether there are any additional combinations of driver settings to evaluate. If there is another combination to evaluate, the "YES" branch is followed to step 510, where the controller 150 selects the next combination of driver settings. If all of the combinations have been evaluated, the "NO" branch is followed to step 535.

In step 535, the controller 150 determines which combination is optimal by evaluating each combination of driver settings based on the calculated light parameters and the selected mode. In certain exemplary embodiments, the controller 150 assigns a score to each combination based on the evaluation. For example, if the selected mode is "white" and the controller 150 calculated a CCT having an abundance of red, the controller 150 would assign a low score to the combination. The controller 150 then determines which combination resulted in the highest score and concludes that the combination having the highest score is optimal.

In step 540, the controller 150 operates the lamps 171-173 using the optimal driver settings. In step 545, an inquiry is conducted by the controller 150 to determine whether to perform a narrow-scope scan. As described above with reference to FIG. 2, this determination can be made based upon operating hours of the lamps 171-173, number of on/off cycles that the lamps 171-173 have undergone, a time period, or any other parameter. If the controller 150 decides to perform the narrow-scope scan, the "YES" branch is followed to step 550. Otherwise, the "NO" branch is followed to return to step 540.

In step 550, the controller 150 selects a color to adjust the settings for. In this example, the controller 150 selects either the array of red LEDs or the array of white LEDs. In other examples, the controller 150 is capable of selecting individual LEDs within either of the arrays. In step 555, the controller 150 increases or decreases the current level for each of the LEDs of the selected color. For example, the controller 150 increases or decreases the supply current by 1% for the LEDs of the selected color.

In step 560, the controller 150 obtains updated measurements from the color sensor 111 and the light sensor 121. In step 560, the controller 150 calculates the updated light parameters using the obtained measurements. The controller 150 then evaluates the updated measurements and applies a score to the updated combination of driver settings based on the measurements. In step 570, an inquiry is conducted by the controller 150 in which the controller 150 compares the updated score to the score for the driver settings used prior to the adjustment to determine if there is an improvement. If the updated score indicates an improvement, then the "YES" branch is followed to step 575. In step 575, the controller 150 further adjusts the current level for the selected color. For example, if the current level for the selected color was increased in the previous adjustment, the controller 150 increases the current level again in step 575. After step 575 is completed, the method 500 returns to step 555.

Referring back to step 570, if the updated score does not indicate an improvement, the "NO" branch is followed to step 550 where another color is selected for a driver setting adjustment. In certain exemplary embodiments, instead of proceeding to step 550 if the updated score does not indicate an improvement, the controller 150 adjusts the current level for the selected color in the opposite direction relative to the previous adjustment. For example, if an increase in current level for the white LEDs resulted in a less optimal score than the previous current level for the white LEDs, the controller 150 will decrease the current level for the white LEDs and proceed to step 560 to begin evaluating this adjustment. If the decrease in current level for the white LEDs resulted in an improved score, then the controller 150 will continue decreasing the current level for the white LEDs until a decrease in current level results in a less optimal score. At that point, the controller 150 will revert back to the last current level for the white LEDs that resulted in an improved score and select another color of LEDs to adjust.

Figure 6:
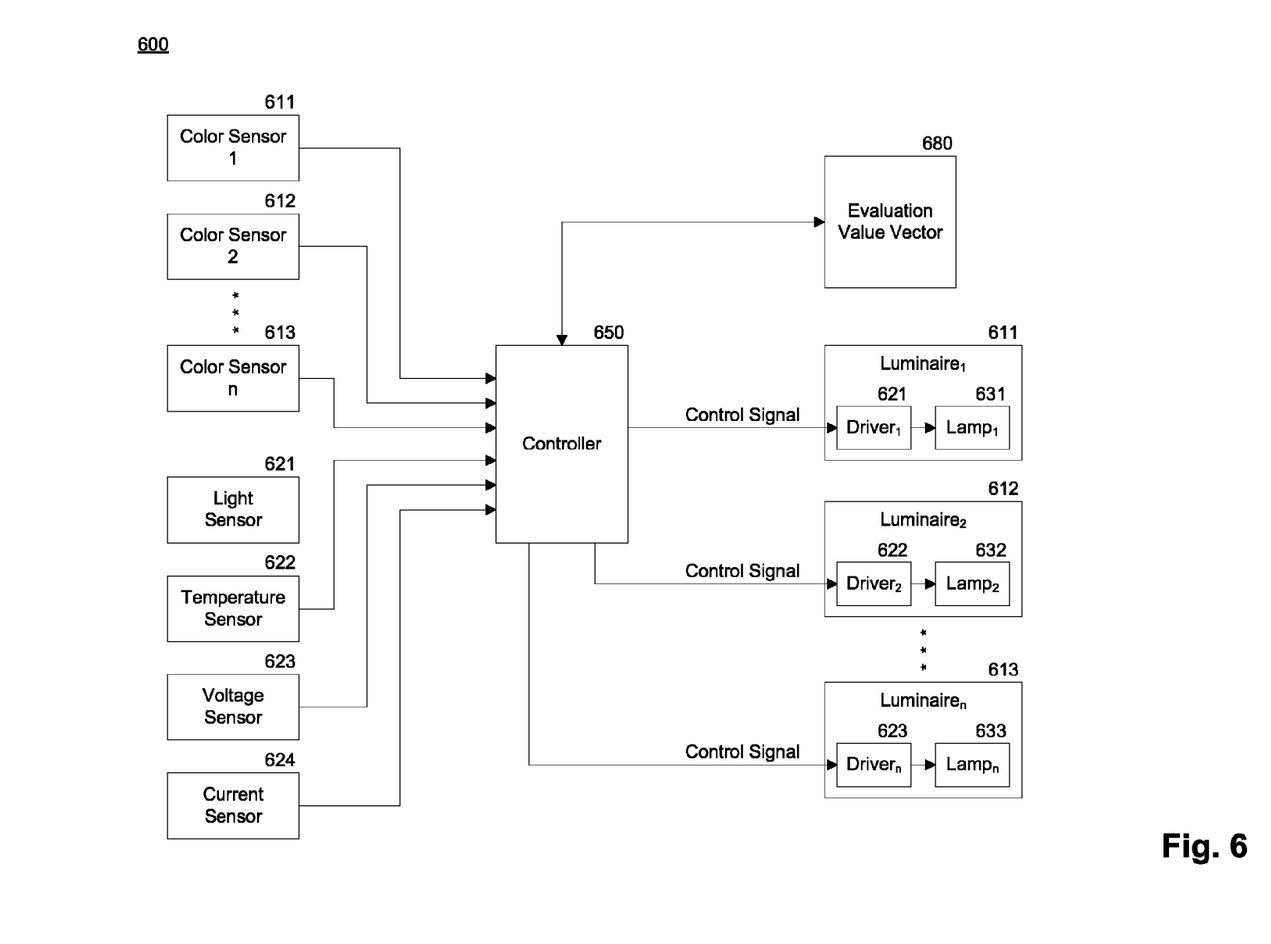
FIG. 6 is a block diagram depicting a lighting control circuit, in accordance with certain exemplary embodiments.

Although FIGS. 1-5 have been described in terms of a controller 150 determining an optimal way to control one or more lamps 171-173, all connected to a single driver circuit 160, the methods and elements described above also can be applied to lighting systems having multiple luminaires, each having a separate driver. For example, FIG. 6 is a block diagram depicting a lighting control circuit 600, in accordance with certain exemplary embodiments.

The lighting control circuit 600 includes similar elements to the elements of the lighting control circuit 100 illustrated in FIG. 1. For example, the lighting control circuit 600 includes a controller 650 coupled to sensors 611-624 and an evaluation vector 680. However, the lighting control circuit 600 controls the output of a number "n" of luminaires 611-613, each having a dedicated driver circuit 621-623, respectively. The controller 650 is similar to the controller 150 as the controller 650 is programmed to perform one or more processes (including a wide-scope and narrow-scope scan) to determine an optimal way to operate the luminaires 611-613 to produce a desired light output and/or to control one or more parameters. Although not shown, each driver circuit 621-623 is coupled to a power source, the same as or similar to the power source 140 illustrated in FIG. 1 and described above.

The controller 650 may be housed in a control panel (not shown) or housed within one of the luminaires 611-613. The controller 650 can be electrically coupled to sensors 611-624 and to the drivers 621-623 of the luminaires 611-613 via electrical conductors or via a wireless communication system. For example, each of the sensors 611-624 and each of the luminaires 611-613 may include a radio frequency ("RF") transceiver for communicating with an RF transceiver coupled to the controller 150. A multi-luminaire embodiment such as that illustrated in FIG. 6 can be especially useful for controlling light in larger areas, such as outside space, meeting rooms, theaters, auditoriums, and other large areas. The multi-luminaire embodiment is also useful in applications that employ different types or design of lamps. For example, it may be desirable to control total light output by an LED lamp and a CFL lamp.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A lighting control circuit, comprising:
   at least one lamp;

a lamp driver circuit electrically coupled to the at least one lamp, wherein the driver circuit controls at least one characteristic of power supplied to the at least one lamp in response to receiving a control signal comprising at least one driver setting defining the adjustment;

at least one sensor for measuring a characteristic of light output by the at least one lamp;

a control circuit communicably coupled to the at least one sensor and the lamp driver circuit, wherein the control circuit performs a process comprising:

providing a plurality of driver settings to the driver circuit via the control signal;

obtaining a measurement from each of the at least one sensor in response to the driver circuit adjusting the at least one characteristic based on each of the driver settings; and evaluating the measurements.

2. The lighting control circuit of claim 1, wherein the control circuit determines which one of the plurality of driver settings provides a better light output condition based on the evaluation and one or more parameters that define a desired light output.

3. The lighting control circuit of claim 2, wherein the one or more parameters comprises at least one of: (a) a correlated color temperature, (b) a color rendering index, (c) color consistency, (d) lumen output, and (e) power efficiency.

4. The lighting control circuit of claim 2, wherein the control circuit provides the control signal comprising the one driver setting to the lamp driver circuit after the process has completed.

5. The lighting control circuit of claim 2, wherein the process further comprises:

making one or more adjustments to the one driver setting;

determining whether the one or more adjustments resulted in an improvement over the one driver setting; and in response to the one or more adjustments resulting in an improvement, using the adjusted driver setting as the one driver setting.

6. The lighting control circuit of claim 2, wherein the at least one lamp comprises a plurality lamps and the at least one sensor comprises a color sensor for each lamp and wherein the one driver setting is determined based upon color consistency between the lamps.

7. The lighting control circuit of claim 2, further comprising:

a current sensor for measuring electrical current consumed by the at least one lamp; and a voltage sensor for measuring a voltage level of the power supplied to the at least on lamp, wherein the control circuit computes the amount of power consumed by the lamps for each driver setting using the current level and voltage level, and wherein the one driver setting is determined based upon the computed power consumption.

8. The lighting control circuit of claim 1, wherein each of the plurality of driver settings comprises at least one of a current level, a pulse width, and a current waveform shape for each of the at least one lamps.

9. The lighting control circuit of claim 1, wherein the at least one sensor comprises at least one of (a) a color sensor for detecting color output and (b) a photosensor for detecting intensity of light output.

10. A method for identifying an output setting for operating a plurality of lamps, comprising the steps of:

(a) providing a combination of driver settings to a driver circuit, the combination of driver settings comprising a driver setting defining at least one characteristic of supply power for at least one of a plurality of lamps;

(b) controlling, by the driver circuit, supply power to each of the plurality of lamps based upon the driver setting for each lamp;

(c) monitoring at least one parameter associated with light output by at least one of the plurality of lamps;

(d) repeating steps (a) through (c) for each of a plurality of additional combinations of driver settings; and (e) evaluating the parameters to determine which one of the plurality of combinations of driver settings results in a better light output condition based on the parameters and a desired light output.

11. The method of claim 10, wherein the at least one characteristic comprises at least one of (a) a level of electrical current of the supply power, (b) a pulse width of the supply power, and (c) a waveform shape of an electrical current of the supply power.

12. The method of claim 10, wherein the at least one parameter comprises at least one of (a) a correlated color temperature of the light output by the lamps, (b) a color rendering index of the light output by the lamps, (c) an intensity of light output by the lamps, (d) consistency of color of the light output by each of the lamps, and (e) power consumption.

13. The method of claim 10, wherein the at least one parameter comprises a plurality of parameters, each having a weight defining that parameter's importance in the determination of which combination of driver settings results in the better light output.

14. The method of claim 10, further comprising the steps of:

receiving a selection of a lighting mode defining how the plurality of lamps are to be operated; and selecting the plurality of output settings for providing to the driver circuit based upon the mode selection.

15. The method of claim 10, further comprising the steps of:

(f) selecting one of the lamps;

(g) adjusting at least one of the at least one characteristics for the selected lamp;

(h) monitoring the at least one parameter in response to the adjustment;

(i) evaluating the monitored parameter(s) to determine whether the adjustment resulted in an improvement relative to the one combination of driver settings;

(j) in response to a determination that the adjustment resulted in an improvement, modifying the one combination of driver settings to control the selected lamp using the adjusted characteristic.

16. The method of claim 15, further comprising the step of (k) repeating steps (f) through (j) for each of the lamps.

17. A lighting system, comprising:

a plurality of luminaires, each comprising at least one lamp and a circuit for controlling power to the at least one lamp based upon a driver setting;

a plurality of sensors, each for measuring a characteristic of light output by at least one of the luminaires; and a controller logically coupled to each luminaire and to each sensor, the controller programmed to perform a process to determine which one of a plurality of driver setting combinations for the luminaires results in a better light output condition based on the measured characteristics, the process comprising:

outputting the plurality of driver setting combinations to the luminaires one at a time, each driver setting combination comprising a driver setting for each luminaire defining at least one characteristic of supply power to the at least one lamp of that luminaire;

obtaining a measurement of the characteristic from each sensor for each driver setting combination; and evaluating the measurements to determine which one of the driver setting combinations results in the better light output condition, wherein the controller operates the luminaires using the one driver setting combination.

18. The lighting system of claim 17, wherein the process further comprises:

adjusting the driver setting for at least one of the luminaires;

obtaining an updated measurement from each sensor;

evaluating the updated measurements to determine whether the adjustment resulted in an improvement over the one combination of driver settings; and in response to the adjustments resulting in an improvement, operating the luminaires using the adjusted driver setting(s).

19. The lighting system of claim 17, wherein the plurality of sensors comprises a color sensor for each luminaire and the one driver setting combination is determined based upon color consistency between the luminaires.

20. The lighting system of claim 17, wherein the plurality of sensors comprises a color sensor for measuring total color output by the plurality of luminaires and wherein the one driver setting combination is determined based upon at least one of (a) correlated color temperature of the total light output and (b) color rendering index of the total color output.

21. The lighting system of claim 17, wherein the plurality of sensors comprises a current sensor for each luminaire and a voltage sensor for each luminaire and wherein the one driver setting combination is determined base upon total power consumption by the luminaires.

22. A computer program product for identifying an output setting for operating a plurality of lamps, the computer program product comprising:

a computer-readable storage medium having computer-readable program code embodied therein, the computer-readable program code comprising:

computer-readable program code for:

(a) providing a combination of driver settings to a driver circuit, the combination of driver settings comprising a driver setting defining at least one characteristic of supply power for at least one of a plurality of lamps;

(b) monitoring at least one parameter associated with light output by at least one of the plurality of lamps in response to the driver circuit controlling supply power to the lamps based upon the driver setting; and (c) repeating (a) and (b) for each of a plurality of additional combinations of driver settings; and computer-readable program code for evaluating the monitored parameters for each combination of driver settings to determine which one of the combinations of driver settings resulted in a better light output condition based on the monitored parameters and a desired light output.

23. The computer program product of claim 22, wherein the at least one characteristic comprises at least one of (a) a level of electrical current of the supply power, (b) a pulse width of the supply power, and (c) a waveform shape of an electrical current of the supply power.

24. The computer program product of claim 22, wherein the at least one parameter comprises at least one of: (a) a correlated color temperature, (b) a color rendering index, (c) color consistency, (d) lumen output, and (e) power efficiency.

25. The computer program product of claim 22, further comprising computer-readable program code for receiving at least one measurement corresponding to each of the at least one parameter from at least one sensor.

26. The computer program product of claim 22, wherein the at least one parameter comprises a plurality of parameters, each having a weight defining that parameter's importance in the determining which of the combinations of driver settings resulted in a better light output condition.

27. The computer program product of claim 22, further comprising computer-readable program code for:

receiving a selection of a lighting mode defining how the desired light output; and selecting the plurality of combinations of driver settings for providing to the driver circuit based upon the mode selection.

28. The computer program product of claim 22, further comprising computer-readable program code for providing the one combination of driver settings to the driver circuit to control the lamps during normal lamp operation.

29. The computer program product of claim 27, further comprising computer-readable program code for:

selecting one of the lamps;

adjusting at least one of the at least one characteristics for the selected lamp;

monitoring the at least one parameter in response to the adjustment;

evaluating the monitored parameter(s) to determine whether the adjustment resulted in an improvement relative to the one combination of driver settings;

in response to a determination that the adjustment resulted in an improvement, modifying the one combination of driver settings to control the selected lamp using the adjusted characteristic.

* * * * *